(12) United States Patent
Chen et al.

(10) Patent No.: US 7,528,916 B2
(45) Date of Patent: May 5, 2009

(54) SUBSTRATE STRUCTURES, LIQUID CRYSTAL DISPLAY DEVICES AND METHODS FOR FABRICATING LIQUID CRYSTAL DISPLAY DEVICES

(75) Inventors: Chung-Hao Chen, Hsinchu County (TW); Yi-An Sha, Taipei (TW); Cheng-Hsi Hsieh, Kaohsiung (TW); Shur-Yir Fuh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 565 days.

(21) Appl. No.: 11/404,288

(22) Filed: Apr. 14, 2006

(65) Prior Publication Data

US 2007/0139593 A1 Jun. 21, 2007

(30) Foreign Application Priority Data

Dec. 21, 2005 (TW) .............................. 94145525 A

(51) Int. Cl.
*G02F 1/1337* (2006.01)
*G02F 1/1333* (2006.01)
(52) U.S. Cl. ....................... 349/123; 349/158

(58) Field of Classification Search ................. 349/123, 349/158, 130, 141
See application file for complete search history.

(56) References Cited

U.S. PATENT DOCUMENTS

| 5,343,318 | A * | 8/1994 | Basturk ........................ 349/22 |
| 6,327,016 | B1 * | 12/2001 | Yamada et al. .............. 349/160 |
| 6,449,028 | B1 * | 9/2002 | Grupp et al. ................. 349/191 |
| 6,522,379 | B1 * | 2/2003 | Ishihara et al. .............. 349/139 |
| 6,862,062 | B2 * | 3/2005 | Kubo et al. .................. 349/129 |
| 7,362,405 | B2 * | 4/2008 | Chae et al. ................... 349/156 |
| 2007/0076161 | A1 * | 4/2007 | Morii ........................ 349/155 |

FOREIGN PATENT DOCUMENTS

JP 2004-325527 11/2004

\* cited by examiner

*Primary Examiner*—Mike Qi
(74) *Attorney, Agent, or Firm*—Quintero Law Office

(57) ABSTRACT

Substrate structures for liquid crystal display devices and methods of fabricating liquid crystal display devices. A substrate structure for the liquid crystal display device comprises a transparent substrate. A patterned protrusion structure is formed to divide a plurality of pixel regions. An alignment layer is filled on the transparent substrate of each pixel region, wherein alignment orientations of liquid crystal molecules on the patterned protrusion structure and on the alignment layer are different.

28 Claims, 8 Drawing Sheets

SUBSTRATE STRUCTURES, LIQUID CRYSTAL DISPLAY DEVICES AND METHODS FOR FABRICATING LIQUID CRYSTAL DISPLAY DEVICES

BACKGROUND OF THE INVENTION

1. Field of the Invention

The present invention relates to liquid crystal display (LCD) devices, and in particular to substrate structures for LCD devices and fabrication methods thereof.

2. Description of the Related Art

Liquid crystal display (LCD) devices have many advantages such as small volume, light weight and low power consumption, and are applicable in a variety of electronic and communication devices including notebook computers, personal digital assistants (PDA), mobile phones and the like, i.e., liquid crystal displays feature lighter weight, thinner profile, and increased portability.

A conventional LCD device includes a pair of substrates with opposing electrodes thereon. A liquid crystal layer is interposed between the pair of substrates. An electric field is applied on the opposing electrodes to control liquid crystal molecular orientations in the liquid crystal layer, thereby displaying desirable images. Two alignment layers are separately interposed between the interfaces between the liquid crystal layer and each substrate, providing initial orientations and pre-tilting status for the molecules in the liquid crystal layer.

From a fabrication point of view, two alignment layers are separately formed on each substrate. Conventional methods provide relief printing or anastatic printing methods to apply polyimide material covering indium tin oxide (ITO) electrodes. Since photo-spacers are formed on a color filter substrate or on an active matrix substrate, the polyimide material also conformably covers the photo-spacers. However, if the alignment layer at the pixel region provides vertical orientation of LC molecules on the substrate, the alignment layer on the side wall of the photo-spacers provides horizontal orientation of LC molecules to the substrate, as shown in FIG. 1.

In FIG. 1, a transparent electrode layer 11 such as indium tin oxide is disposed on a transparent substrate 10. A plurality of photo-spacers 12 are formed on the transparent substrate 10 dividing a plurality of pixel regions. An alignment layer 13 such as polyimide (PI) is disposed on the transparent substrate 10 conformably covering the photo-spacers 12. Since the alignment layer 13 provides liquid crystal molecules having the same orientation and pre-tilting status, the liquid crystal molecules 14a neighboring the photo-spacers 12, i.e., within region b-b, are aligned with the alignment layer 13a on sidewalls of the photo-spacers 12, thereby creating horizontal orientation. The liquid crystal molecules 14 in the pixel region have different alignment orientations, i.e., vertical orientation from the liquid crystal molecules 14a leading to light leakage near the photo-spacers 12.

The above mentioned light leakage due to different alignment orientations adjacent to the photo-spacers may cause low contrast ratio and deteriorate display quality. Accordingly, in order to reduce light leakage, an additional black matrix (BM) area corresponding to the photo-spacers is provided to shield light leakage near the photo-spacers. Although the additional black matrix area can effectively solve the light leakage problem, the additional black matrix area, however, also reduces aperture of the display panel as well as display luminance.

FIGS. 2A-2D are cross sections showing conventional fabrication steps of an alignment layer with different orientation regions on a display substrate. The alignment layer on the sidewalls of the photo-spacers 12 is modified by photochemical reaction, thereby ameliorating the light leakage problem. Japan Patent No. 2004325527, the entirety of which is hereby incorporated by reference, discloses an alignment layer such as fluoride containing silane polymer or polyimide (PI) is applied on a transparent substrate. The alignment layer is pyrophobic (hydrophorbic) with vertically orientated LC molecules. A photo-catalyst mask is used to induce the alignment layer near the photo-spacers creating hydrophilic radicals, thereby creating a hydrophilic alignment region with horizontal alignment orientations neighboring the photo-spacers.

Referring to FIG. 2A, a transparent substrate 2 with a plurality of protrusion structures 12 thereon is provided. For example, a plurality of photo-spacers are formed on a transparent glass to divide a plurality of pixel regions. Next, an alignment layer 20a such as a fluoride containing silane polymer layer is conformably formed on the transparent substrate 2 covering the protrusion structures 12. The alignment layer 20a is pyrophobic (hydrophorbic) with vertical alignment orientations.

Referring to FIG. 2B, a photo-catalyst mask 22 with a transparent region corresponding to the protrusion structures 12 is provided. The transparent substrate 2 is illuminated by UV radiation 26 using the photo-catalyst mask 22 as a shield. The alignment layer 23 near the photo-spacers is photochemically reacted generating a hydrophilic radical, thereby creating a hydrophilic alignment region 23a with horizontal alignment orientations neighboring the photo-spacers, as shown in FIG. 2C. The photo-chemically reacted alignment region 23a provides liquid crystal molecules horizontal alignment orientations.

Alternatively, a photo-catalyst can be added to the alignment layer and directly irradiate UV light using a photo-mask as a shield. The alignment layer near the photo-spacers is photo-chemically reacted creating a hydrophilic radical, thereby creating a hydrophilic alignment region 23b with horizontal alignment orientations neighboring the photo-spacers, as shown in FIG. 3. The conventional method, however, requires applying the alignment layer to the entire substrate and the tedious addition of photo-catalyst and photo mask procedures, causing high production cost and low yield.

BRIEF SUMMARY OF THE INVENTION

A detailed description is given in the following embodiments with reference to the accompanying drawings.

Accordingly, a substrate structure for a liquid crystal display device is provided. A patterned protrusion structure is disposed on a transparent substrate to divide a plurality of pixel regions. An alignment layer is formed by inkjet printing within each pixel region. The surface of the protrusion structure is physically treated to modify the orientations of liquid crystal molecules on the protrusion structure. In an aspect of the invention, the orientations of liquid crystal molecules on the protrusion structure are substantially different from the orientations of liquid crystal molecules on the alignment layer.

According to an embodiment of the invention, a substrate structure for a liquid crystal display device is provided. The substrate structure comprises a substrate, a patterned protrusion structure disposed on the substrate to divide a plurality of pixel regions, and an alignment layer disposed on the substrate within each pixel region. Orientations of liquid crystal molecules on the patterned protrusion structure and on the alignment layer are different.

According to another embodiment of the invention, a liquid crystal display device comprises a first substrate, a second substrate opposing the first substrate, and a liquid crystal layer interposed between the first and the second substrates. A patterned protrusion structure is disposed on the substrate to divide a plurality of pixel regions. An alignment layer is disposed on the substrate within each pixel region, wherein alignment orientations of liquid crystal molecules on the patterned protrusion structure and alignment layer are different.

According to another embodiment of the invention, a method for fabricating a liquid crystal display device is provided. A patterned protrusion structure is formed on a first substrate to divide a plurality of pixel regions. An alignment layer is applied on the substrate within each pixel region. A second substrate is assembled opposing the first substrate. A liquid crystal layer is injected between the first and the second substrates. Orientations of liquid crystal molecules on the patterned protrusion structure and alignment layer are different.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention is directed to a substrate structure for an LCD device in which a patterned protrusion structure is used as photo-spacers for dividing a plurality of pixel regions. An alignment layer is formed within each pixel region by inkjet printing. The surface characteristics of the protrusion structure are modified by physical treatment, thereby alignment orientations of liquid crystal molecules on the alignment layer are unified.

Figure 1:
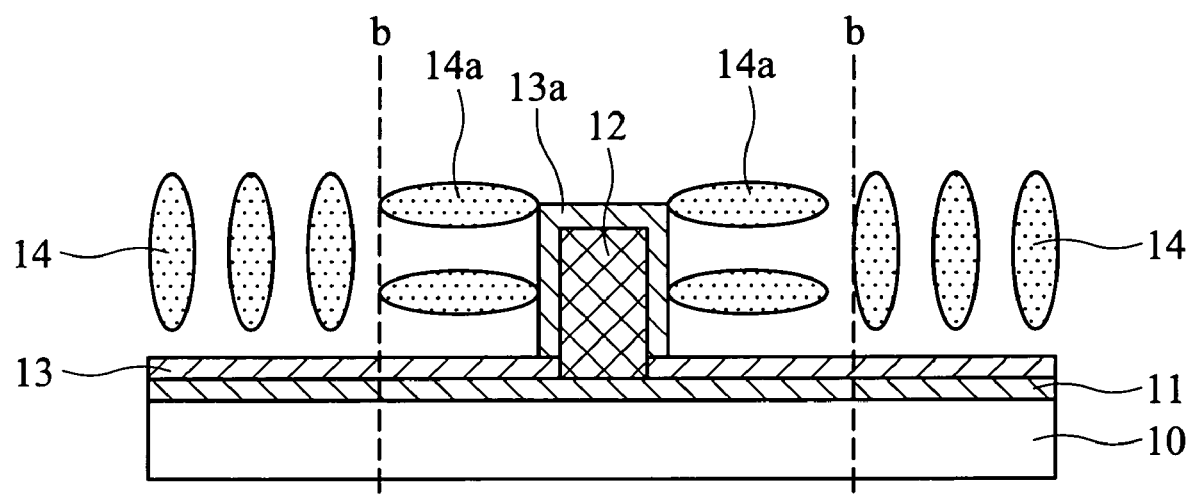
FIG. 1 is a schematic view showing different orientations of liquid crystal molecules on the photo-spacers of a conventional LCD device.
Figure 2A:
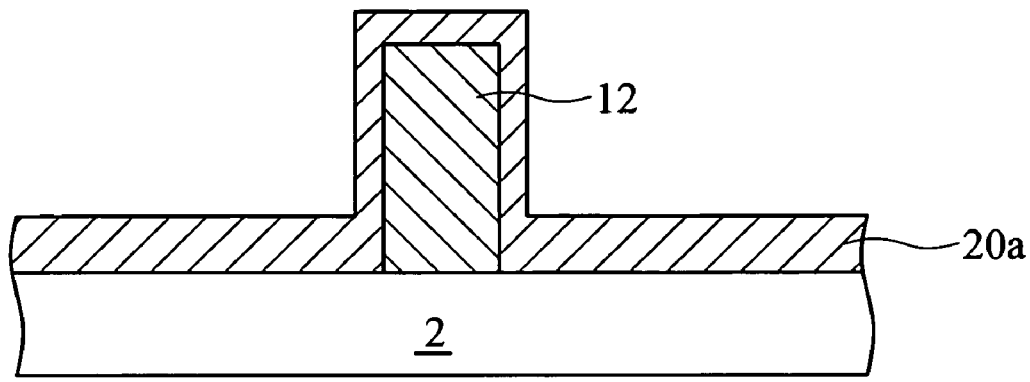
FIGS. 2A-2D are cross sections showing conventional fabrication steps of an alignment layer with different orientation regions on a display substrate.
Figure 2B:
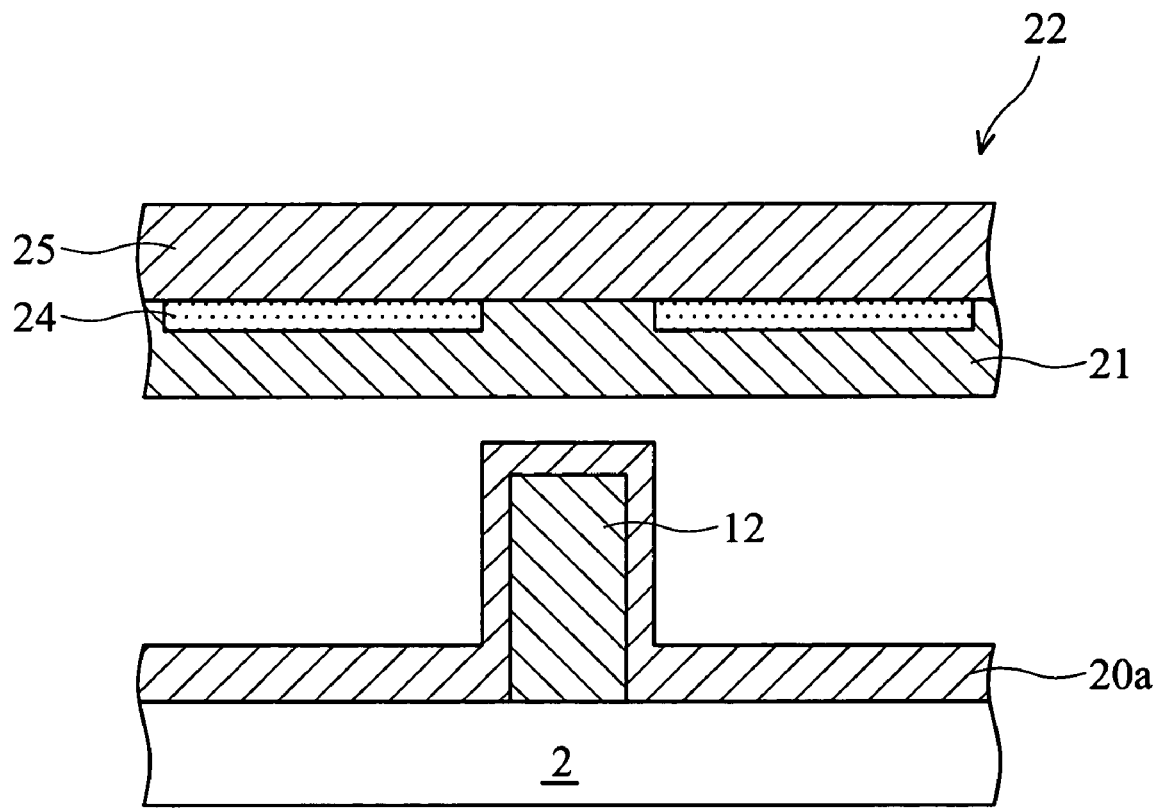
Figure 2C:
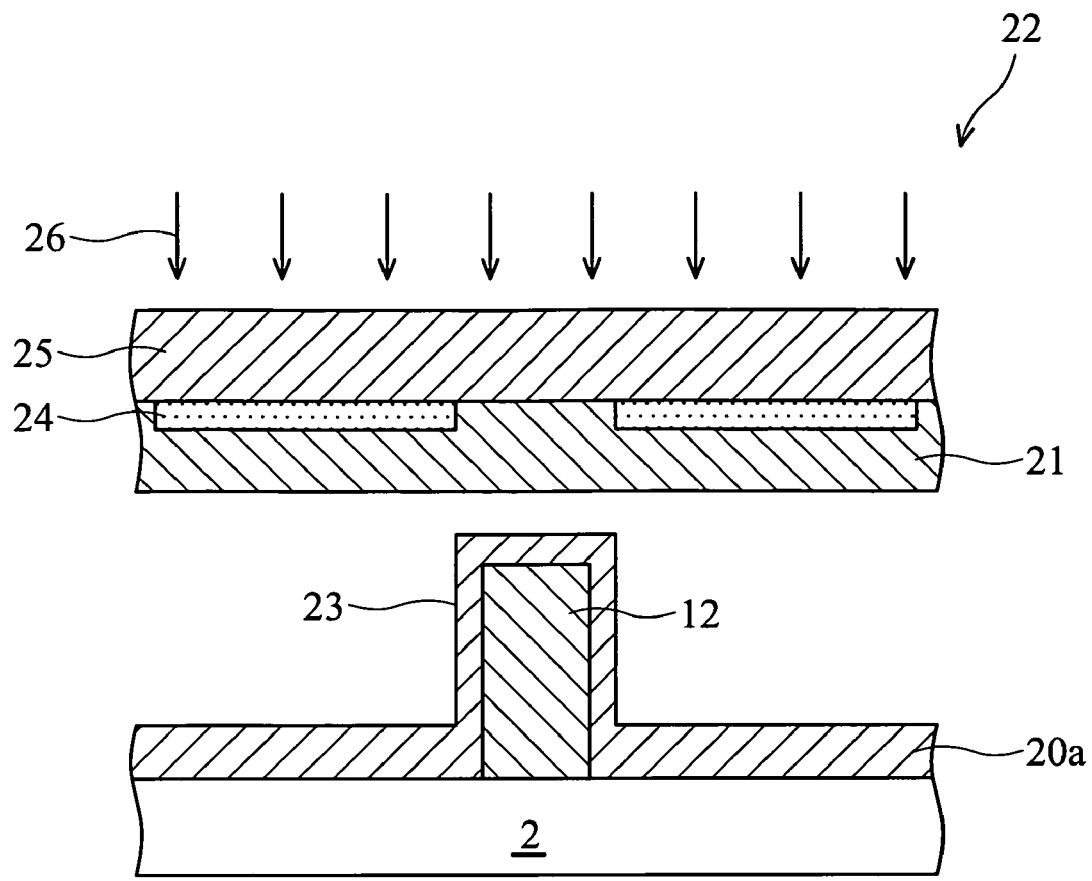
Figure 2D:
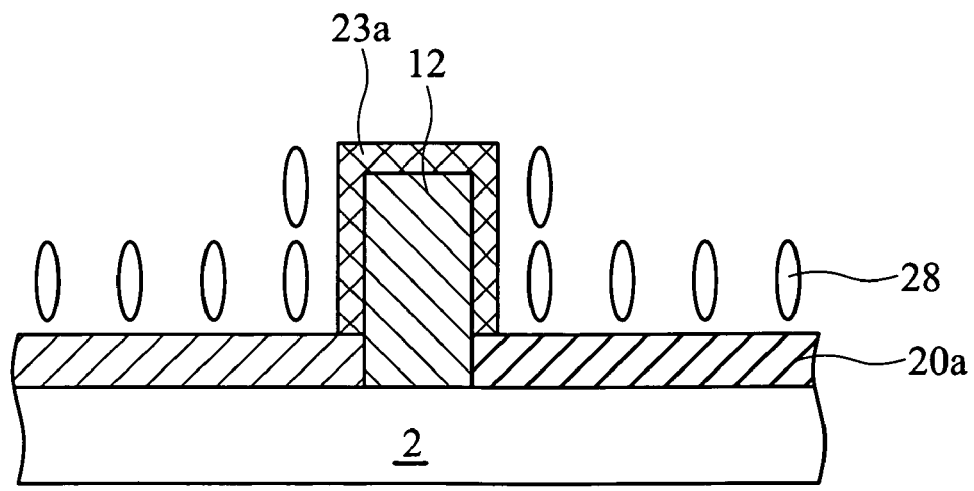
Figure 3:
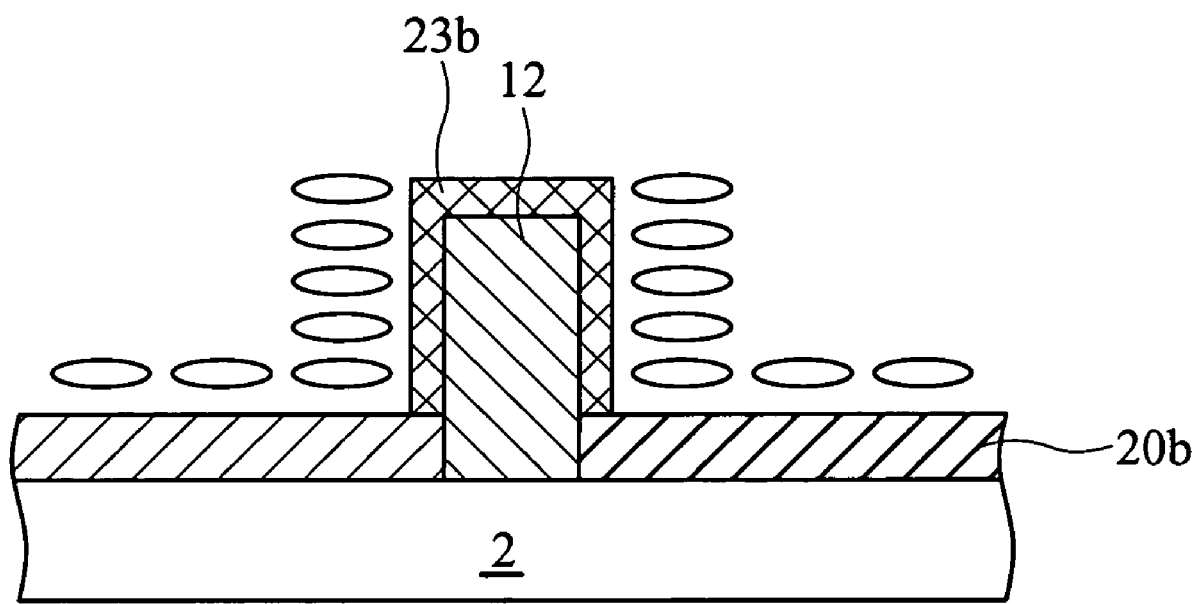
FIG. 3 is a schematic view of a conventional method of creating a hydrophilic alignment region with horizontal alignment orientations neighboring the photo-spacers.
Figure 4:
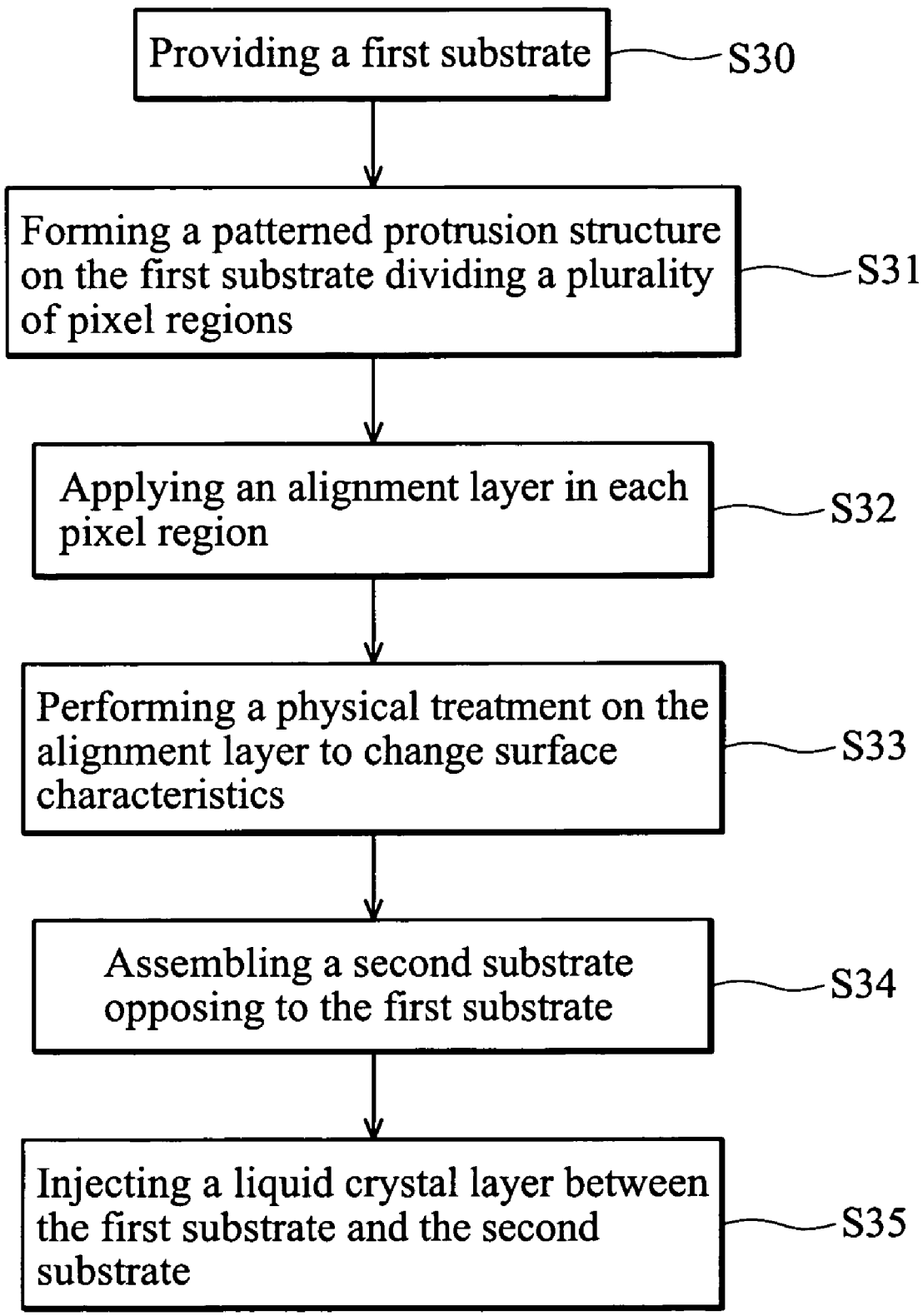
FIG. 4 is a flow chart of a fabrication method of a liquid crystal display device according to an embodiment of the invention.

FIG. 4 is a flowchart of a fabrication method of a liquid crystal display device according to an embodiment of the invention. In step S30, a first transparent substrate such as a color filter substrate is provided. The color filter substrate includes red (R), green (G) and blue (B) color layers periodically disposed on a transparent substrate. A transparent electrode is disposed on the first transparent substrate. Next, in step S31, a patterned protrusion structure is formed on the first transparent substrate to divide a plurality of pixel regions. The patterned protrusion structure preferably comprises a plurality of photo-spacers. In step S32, an alignment layer is formed on the first transparent substrate within each pixel region. For example, a polyimide (PI) layer is formed by inkjet printing on the first transparent substrate within each pixel region, exposing the patterned protrusion structure. A baking procedure including soft and hard baking is performed to polymerize the PI layer.

Next, in step S33, the first transparent substrate is physically treated using a mask as shielding. For example, a plasma treatment is performed on the exposed protrusion structure to modify LC molecular orientations on the protrusion structure. Next, in step S34, a second substrate is assembled opposing the first substrate. The second substrate can be an active matrix substrate. A gap between the first and the second substrates is defined by the protrusion structure. Next, in step S35, a liquid crystal material is injected between the first and the second substrates. For example, a liquid crystal layer can be interposed between the first and the second substrates by vacuum injection.

Figure 5A:
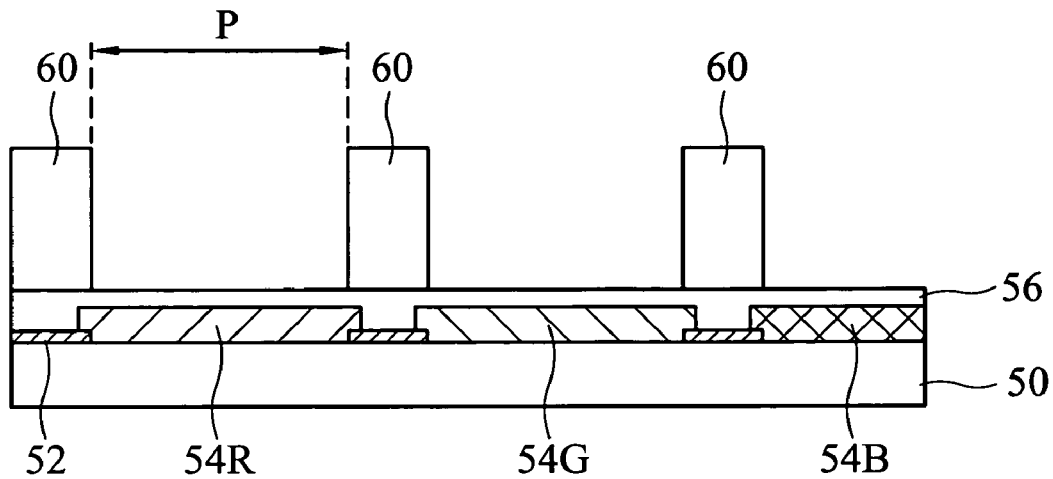
FIGS. 5A-5C are cross sections showing fabrication steps of a substrate structure of an LCD device according to an embodiment of the invention.
Figure 5B:
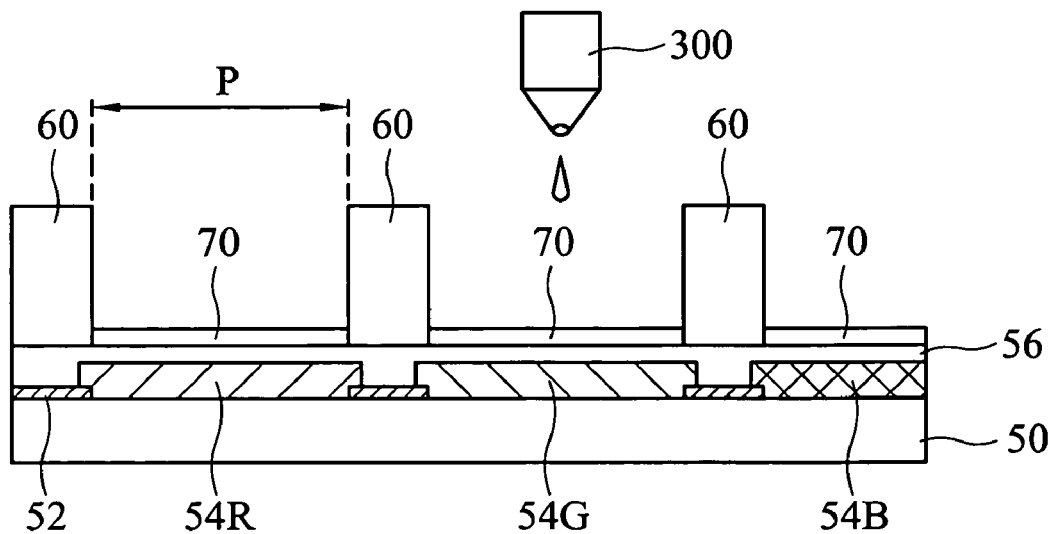
Figure 5C:
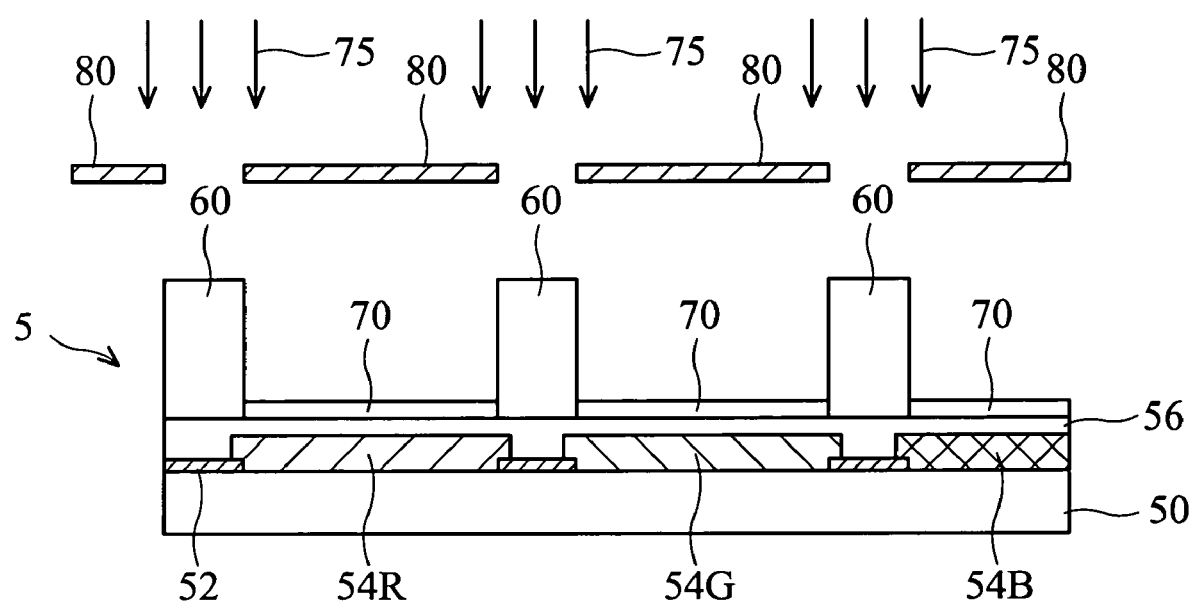

FIGS. 5A-5C are cross sections showing fabrication steps for a substrate structure of an LCD device according to an embodiment of the invention. Referring to FIG. 5A, a substrate 50 such as a glass substrate, or a transparent plastic substrate is provided. A color filter is disposed on the substrate 50. The color filter substrate includes red 54R, green 54G and blue 54B color layers periodically disposed on a transparent substrate. A black matrix (BM) 52 is disposed between color layers 54R, 54G, and 54B. A passivation layer 56 is disposed on the color layer and black matrix 52. A transparent electrode (not shown) is disposed on the passivation layer 56. While this embodiment has been described in conjunction with an example of a color filter substrate, the features of this embodiment may also be applied to an active matrix substrate.

Next, a patterned protrusion structure 60 is formed on the first substrate 50 to divide a plurality of pixel regions P. The patterned protrusion structure 60 can be photo-spacers formed by photolithography. For example, the patterned protrusion structure 60 can be any protruding structure formed by dry film attaching, scrap casting, spin coating, inkjet printing, laser-induced thermal imaging (LITI), printing, or imprinting. Note that the geometric shape of the protrusion structure 60 is not limited, including a cylinder, a polygon, a column, a cup, or a semi-hemisphere.

Referring to FIG. 5B, an alignment layer 70 is formed on the first substrate 50 within each pixel region P. More specifically, a polyimide (PI) layer is formed by inkjet printing on the first substrate within each pixel region, exposing the patterned protrusion structure 60. For example, a fluid injector 300, such as thermal bubble driven inkjet printhead or piezoelectric diaphragm driven inkjet printhead, can inject droplets of alignment material into each pixel region P. The material of the alignment layer preferably comprises polyvinyl alcohol (PVA), polyimide (PI), polyamide (PA), polyurea (PU), nylon, or lecithin. After an 180° C. baking procedure, the alignment layer is rubbed to provide initial orientation and pre-tilt angle for the liquid crystal molecules.

Referring to FIG. 5C, the first substrate 50 is physically treated using a mask 80 as shielding. For example, plasma 75 is induced bombarding the surface of the protrusion structure 60, thereby modifying orientations of LC molecules on the protrusion structure 60. In an aspect of the invention, the orientation of liquid crystal molecules on the protrusion structure 60 is substantially different from the orientation of liquid crystal molecules on the alignment layer 70.

Alternatively, in another embodiment of the invention, the protrusion structure 60 is irradiated with UV light using a photocatalyst mask as a shield to modify orientations of LC molecules on the protrusion structure 60. Therefore, orientations of liquid crystal molecules on the protrusion structure 60 are substantially different from the orientations of liquid crystal molecules on the alignment layer 70.

Moreover, the material of the protrusion structure 60 is selected to have different polarities from the alignment layer. For example, if the protrusion structure 60 is hydrophilic, the alignment layer is hydrophobic. Therefore, the surface tension of liquid crystal molecules on the protrusion structure 60 is substantially different from that on the alignment layer 70.

Accordingly, the alignment layer 70 preferably provides a vertical liquid crystal molecule orientation, i.e., a longitudinal axis of the liquid crystal molecule is pre-tilted 75-90 degrees against the alignment layer 70, while the patterned protrusion structure 60 provides a horizontal liquid crystal molecule orientation, i.e., a longitudinal axis of the liquid crystal molecule is pre-tilted 0-15 degrees against the patterned protrusion structure 60. Alternatively, the alignment layer 70 provides a horizontal liquid crystal molecule orientation, i.e., a longitudinal axis of the liquid crystal molecule is pre-tilted 0-15 degrees against the alignment layer 70, while the patterned protrusion structure 60 provides a vertical liquid crystal molecule orientation, i.e., a longitudinal axis of the liquid crystal molecule is pre-tilted 75-90 degrees against the patterned protrusion structure 60.

Figure 6:
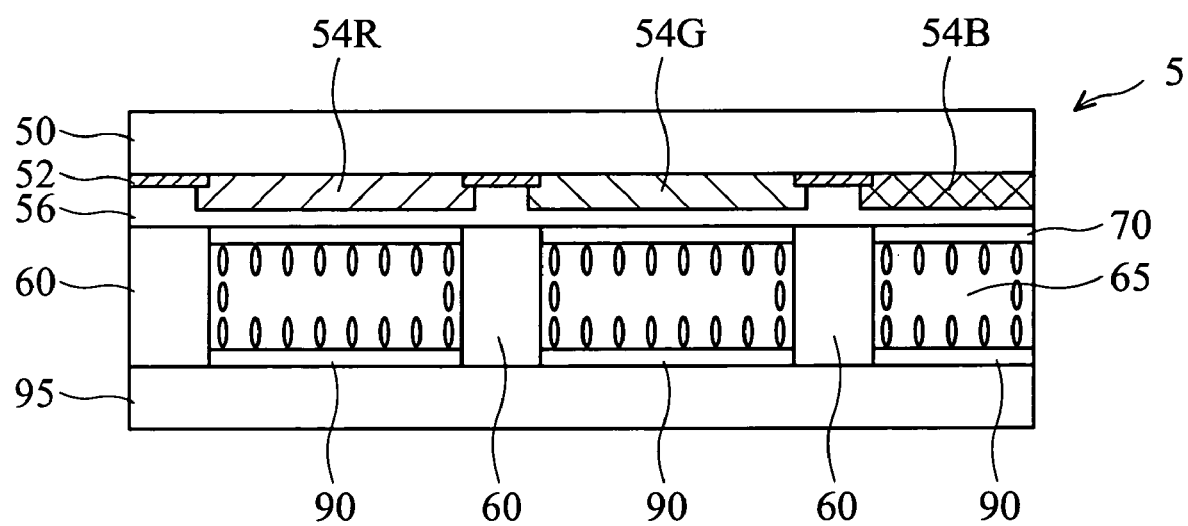
FIG. 6 is a cross section of a substrate structure 5 fabricated by steps illustrated in FIGS. 5A-5C.

FIG. 6 is a cross section of a substrate structure 5 fabricated by steps illustrated in FIGS. 5A-5C. In FIG. 6, after a physical treatment is performed, a second substrate 95 is assembled opposing the first substrate structure 5. The second substrate 95 can be an active matrix substrate with an alignment layer 90 thereon. A gap between the first and the second substrates is defined by the protrusion structure 60. Next, a liquid crystal material is injected between the first and the second substrates. For example, a liquid crystal layer 65 can be interposed between the first and the second substrates by vacuum injection. An LCD device with high contrast ratio, high aperture, and low light leakage is thus created.

According to another embodiment of the invention, the liquid layer 65 can be filled by a one drop filling (ODF) method. More specifically, the liquid crystal layer 65 can be formed by inkjet printing on the substrate structure within each pixel region P. For example, a fluid injector (not shown), such as thermal bubble driven inkjet printhead or piezoelectric diaphragm driven inkjet printhead, can inject droplets of liquid crystal material into each pixel region P, then assembling the second substrate opposing the first substrate.

The invention is advantageous in that a physical treatment is performed to modify surface characteristics of the protrusion structure of an LCD device in which alignment orientations of liquid crystal molecules on the patterned protrusion structure and alignment layer are different. The orientation of liquid crystal molecule are substantially equal, thereby ameliorating light leakage problems as well as maintaining high contrast ratio and high aperture.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A substrate structure for a liquid crystal display device, comprising:
   a substrate;
   a patterned protrusion structure disposed on the substrate to divide a plurality of pixel regions; and
   an alignment layer disposed on the substrate within each pixel region,
   wherein alignment orientations of liquid crystal molecules on the patterned protrusion structure and on the alignment layer are different.

2. The substrate structure as claimed in claim 1, wherein the substrate is a color filter substrate with transparent electrodes thereon.

3. The substrate structure as claimed in claim 1, wherein the substrate structure is an active matrix substrate with transparent electrodes thereon.

4. The substrate structure as claimed in claim 1, wherein the patterned protrusion structure comprises a plurality of photo-spacers.

5. The substrate structure as claimed in claim 1, wherein the alignment layer within each pixel region is formed by inkjet printing.

6. The substrate structure as claimed in claim 1, wherein the alignment layer provides a vertical liquid crystal molecule orientation, wherein a longitudinal axis of the liquid crystal molecule is pre-tilted 75-90 degrees against the alignment layer; and wherein the patterned protrusion structure provides a horizontal liquid crystal molecule orientation, wherein a longitudinal axis of the liquid crystal molecule is pre-tilted 0-15 degrees against the patterned protrusion structure.

7. The substrate structure as claimed in claim 1, wherein the alignment layer provides a horizontal liquid crystal molecule orientation, wherein a longitudinal axis of the liquid crystal molecule is pre-tilted 0-15 degrees against the alignment layer; and wherein the patterned protrusion structure provides a vertical liquid crystal molecule orientation, wherein a longitudinal axis of the liquid crystal molecule is pre-tilted 75-90 degrees against the patterned protrusion structure.

8. The substrate structure as claimed in claim 1, wherein the alignment layer comprises polyvinyl alcohol (PVA), polyimide (PI), polyamide (PA), polyurea (PU), nylon, or lecithin.

9. The substrate structure as claimed in claim 1, wherein the patterned protrusion structure is formed by lithography, printing, inkjet printing, or spin coating.

10. A liquid crystal display device, comprising:
    a first substrate;
    a second substrate opposing the first substrate;
    a liquid crystal layer interposed between the first and the second substrates;
    a patterned protrusion structure disposed on the first or the second substrate to divide a plurality of pixel regions; and
    an alignment layer disposed on the first or the second substrate within each pixel regions,
    wherein alignment orientations of liquid crystal molecules on the patterned protrusion structure and on the alignment layer are different.

11. The liquid crystal display device as claimed in claim 10, wherein the substrate is a color filter substrate with transparent electrodes thereon.

12. The liquid crystal display device as claimed in claim 10, wherein the substrate structure is an active matrix substrate with transparent electrodes thereon.

13. The liquid crystal display device as claimed in claim 10, wherein the patterned protrusion structure comprises a plurality of photo-spacers.

14. The liquid crystal display device as claimed in claim 10, wherein the alignment layer within each pixel region is formed by inkjet printing.

15. The liquid crystal display device as claimed in claim 10, wherein the alignment layer provides a vertical liquid crystal molecule orientation, wherein a longitudinal axis of the liquid crystal molecule is pre-tilted 75-90 degrees against the alignment layer; and wherein the patterned protrusion structure provides a horizontal liquid crystal molecule orientation, wherein a longitudinal axis of the liquid crystal molecule is pre-tilted 0-15 degrees against the patterned protrusion structure.

16. The liquid crystal display device as claimed in claim 10, wherein the alignment layer provides a horizontal liquid crystal molecule orientation, wherein a longitudinal axis of the liquid crystal molecule is pre-tilted 0-15 degrees against the alignment layer; and wherein the patterned protrusion structure provides a vertical liquid crystal molecule orientation, wherein a longitudinal axis of the liquid crystal molecule is pre-tilted 75-90 degrees against the patterned protrusion structure.

17. The liquid crystal display device as claimed in claim 10, wherein the alignment layer comprises polyvinyl alcohol (PVA), polyimide (PI), polyamide (PA), polyurea (PU), nylon, or lecithin.

18. The liquid crystal display device as claimed in claim 10, wherein the patterned protrusion structure is formed by lithography, printing, inkjet printing, or spin coating.

19. A method for fabricating a liquid crystal display device, comprising:
providing a first substrate;
forming a patterned protrusion structure on the first substrate to divide a plurality of pixel regions;
applying an alignment layer on the substrate within each pixel region;
assembling a second substrate opposing the first substrate; and
injecting a liquid crystal layer between the first and the second substrates,
wherein alignment orientations of liquid crystal molecules on the patterned protrusion structure and on the alignment layer are different.

20. The method as claimed in claim 19, wherein the first substrate is a color filter substrate with transparent electrodes thereon.

21. The method as claimed in claim 19, wherein the first substrate structure is an active matrix substrate with transparent electrodes thereon.

22. The method as claimed in claim 19, wherein the patterned protrusion structure comprises a plurality of photo-spacers.

23. The method as claimed in claim 22, wherein the plurality of photo-spacers are formed by dry film attaching, scrap casting, spin coating, inkjet printing, laser-induced thermal imaging (LITI), printing, or imprinting.

24. The method as claimed in claim 22, further comprising performing a plasma treatment on the surface of the photo-spacers to modify surface alignment orientations.

25. The method as claimed in claim 22, wherein the polarity and the surface tension of liquid crystal molecules on the patterned protrusion structure and the alignment layer are different.

26. The method as claimed in claim 22, further comprising irradiating the photo-spacers using a photocatalyst mask as a shield to modify surface alignment orientations.

27. The method as claimed in claim 19, wherein the alignment layer comprises polyvinyl alcohol (PVA), polyimide (PI), polyamide (PA), polyurea (PU), nylon, or lecithin.

28. The method as claimed in claim 19, wherein the alignment layer within each pixel region is formed by inkjet printing.

\* \* \* \* \*